(12) United States Patent
Cook et al.

(10) Patent No.: US 9,589,388 B1
(45) Date of Patent: Mar. 7, 2017

(54) MECHANISM FOR MINIMAL COMPUTATION AND POWER CONSUMPTION FOR RENDERING SYNTHETIC 3D IMAGES, CONTAINING PIXEL OVERDRAW AND DYNAMICALLY GENERATED INTERMEDIATE IMAGES

(71) Applicant: THINCI, INC., El Dorado Hills, CA (US)

(72) Inventors: Val G. Cook, Shingle Springs, CA (US); Satyaki Koneru, Folsom, CA (US); Ke Yin, El Dorado Hills, CA (US); Dinakar C. Munagala, El Dorado Hills, CA (US)

(73) Assignee: ThinCI, Inc., El Dorado Hills, CA (US)

( * ) Notice: Subject to any disclaimer, the term of this patent is extended or adjusted under 35 U.S.C. 154(b) by 208 days.

(21) Appl. No.: 14/327,432

(22) Filed: Jul. 9, 2014

Related U.S. Application Data

(60) Provisional application No. 61/844,568, filed on Jul. 10, 2013.

(51) Int. Cl.
*G06T 17/00* (2006.01)
*G06T 1/60* (2006.01)
(Continued)

(52) U.S. Cl.
CPC ............. *G06T 15/405* (2013.01); *G06T 1/60* (2013.01); *G06T 15/005* (2013.01); *G06T 15/04* (2013.01); *G06T 15/80* (2013.01); *G06T 17/20* (2013.01)

(58) Field of Classification Search
CPC ....... G06T 11/006; G06T 17/00; G06T 15/00; G06T 13/80; G06T 15/405; G06T 1/60; G06T 11/00; G06T 11/40; G06T 15/005
See application file for complete search history.

(56) References Cited

U.S. PATENT DOCUMENTS

| | | | |
|---|---|---|---|
| 8,847,981 B2 * | 9/2014 | Cho | G06T 15/40 345/418 |
| 8,970,583 B1 * | 3/2015 | Overbeck | G06T 17/05 345/419 |

(Continued)

*Primary Examiner* — Jeffrey Chow
(74) *Attorney, Agent, or Firm* — Fernandez & Associates, LLP

(57) ABSTRACT

Embodiments disclosed include a mechanism in a system and method for significantly reducing power consumption by reducing computation and bandwidth. This mechanism is particularly applicable for modern 3D synthetic images which contain high pixel overdraw and dynamically generated intermediates images. Only blocks of computation which contribute to the final image are performed. This is accomplished by rendering in reverse order and by performing multiple visibility sort in a streaming fashion through the pipeline. Rendering of dynamically generated intermediate images is performed sparsely by projecting texture coordinates from a current image back into one or more dependent images in a recursive manner. The newly computed pixel values are then filtered and control is returned to the sampling shader of the current image. When only visible pixels are projected optimal computation is performed. Several implementations are presented with increasing efficiency. An acceleration structure, termed a Draw Buffer, simplifies the process of projecting backward and utilizes a hardware managed dynamic memory object. This mechanism reduces computation by 50%, with significant bandwidth and power savings.

41 Claims, 24 Drawing Sheets

(51) Int. Cl.
  *G06T 15/40*   (2011.01)
  *G06T 15/00*   (2011.01)
  *G06T 15/04*   (2011.01)
  *G06T 17/20*   (2006.01)
  *G06T 15/80*   (2011.01)

(56) References Cited

U.S. PATENT DOCUMENTS

2006/0274085 A1*  12/2006  Cook ................... G06T 13/20
                                                    345/620
2015/0130793 A1*  5/2015  Han ..................... G06T 19/20
                                                    345/419

\* cited by examiner

Example: Contributing portions of intermediate images.

| Draw Call | Triangle Sequence | Display List Offset |
|---|---|---|
| 0 | 51 | 0x00000000 |
| 1 | 12,705 | 0x00000100 |
| 2 | 13,083 | 0x00000180 |
| 3 | 16,515 | 0x00000200 |
| 4 | 16,791 | 0x00000340 |
| 5 | 17,544 | 0x00000600 |
| 6 | 17,640 | 0x00000800 |
|   | 17,644 | 0x00000820 |

FIG.13

| 63 | 48 47 | | 32 |
|---|---|---|---|
| B TriangleId | | A TriangleId | |

| 31 | 18 17 | | 10 9 8 | 7 | 6 5 4 3 2 | 1 0 |
|---|---|---|---|---|---|---|
| Slope | Intercept | | Edge | X | Valid | Op |

FIG.14

Table No.1

| Resource/Properties | Description |
|---|---|
| Main program Pointer | The main program kernel to be executed |
| Subroutine point | A list of dynamically linked subroutine which m called by main program |
| Input buffers | A list of input buffers and their properties |
| Input element description | A list of describing elements contained in the inp buffers |
| Output buffers | A list of output buffers and their properties |
| Output element descriptions | A list of describing elements contained in the output buffers |
| Constant buffer | A list of input buffers, who's data is prefetched |
| Working memory buffer | A local read / write working buffer for arbitrary operations such as spilling registers |
| Sampler states | A list of state control blocks for sample unit |
| Texture maps | A list of texture map and their properties |

FIG. 17

Table No.2

| Dimensions | Description |
|---|---|
| Super page address | Address on the first level surface.(must be super page aligned ). |
| Page index | Index of the page within super-page. |
| Layer index | Layer index of memory object. |

FIG. 18

Table No.3

| State Attributes | Description |
|---|---|
| Super page size | The size of super page in pages |
| Level size | The size of complete layer in pages. |

FIG. 19

Table No.4

| Operations | Description |
|---|---|
| Initialize | A form of write which initialize the Super page by replicating cache line. |
| Append | Allocate a new supper page as the last layer and write the cache line |
| Append_ initialize | Allocate a new supper page as the last layer , initialize the new supper page with the default value and write the cache line data |
| Read | Read the cache line at the specified super page, page and layer Reads beyond allocated space return the default value the current no of layer at the specified super Page are returned in addition cache line . |
| Write | Write the cache line at specified super page, page and layer write the next layer beyond currently allocated no. of layers are treated as an append |
| Write _ initialize | Write the cache line at specified super page, page and layer.write the next layer beyond currently allocated no. of layers are treated as an append_ initialize. |
| Number Layers | Return the no. of layers |

FIG. 20

Table No.5

| Draw call | Triangle sequence | Display list offset |
|---|---|---|
| 0 | 51 | 0x00000000 |
| 1 | 12,705 | 0x00000100 |
| 2 | 13,083 | 0x00000180 |
| 3 | 16,515 | 0x00000200 |
| 4 | 16,791 | 0x00000340 |
| 5 | 17,544 | 0x00000600 |
| 6 | 17,640 | 0x00000800 |
| 7 | 17,644 | 0x00000820 |

FIG. 21

MECHANISM FOR MINIMAL COMPUTATION AND POWER CONSUMPTION FOR RENDERING SYNTHETIC 3D IMAGES, CONTAINING PIXEL OVERDRAW AND DYNAMICALLY GENERATED INTERMEDIATE IMAGES

CROSS-REFERENCE TO RELATED APPLICATIONS

The present application claims priority from U.S. Provisional Application Ser. No. 61/844,568 for "A Mechanism for Minimal Computation and Power Consumption for Rendering Synthetic 3D Images, containing Pixel Overdraw and Dynamically Generated Intermediate Images", filed on Jul. 10, 2013, the disclosure of which is incorporated herein by reference in its entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND

Some basic background regarding the fundamental concepts associated with the value of the following ideas is beneficial.

Overdraw

Rendering synthetic 3D images commonly employs an algorithm for removing occluded or hidden surfaces. In the example illustrated in FIG. 1A, the yellow sphere obscures a portion of the blue sphere. When using a depth buffer style algorithm the pixels that are nearest to the viewer, at the time the geometry is processed, update the final image. For example, if the geometry for the blue sphere is delivered prior to the yellow sphere, all of the pixels associated with the blue sphere will be written to the image, a portion of which will subsequently be overwritten by the yellow sphere. This extra work, that does not contribute to the final image, is called overdraw.

Rendering Intermediate Images

The process of rendering synthetic images also involves producing intermediate images, which are commonly used to represent various dynamic illumination effects. For example generating shadows, reflections, specular lighting, and other contributions from global illumination models (see FIGS. 1A-1C). These effects are typically approximated using preliminary rendering passes, which capture illumination properties. The process of generating each of these intermediate images is known as a "render pass". These images are then used as texture maps in subsequent render pass as indicated in FIGS. 1B and 1C. This is accomplished by rendering each such pass in the order presented by the application. This sequence is called Forward Rendering.

For example, consider shadow maps or projective shadowing whereby shadows are added to 3D synthetic image. If one looks out from a source of light, all of the objects seen will appear in light. Anything behind those objects, however, will be in shadow. This is the basic principle used to create a shadow map. The light's view is rendered into an intermediate image, thus storing the distance between the light source and every surface it sees (the shadow map). Later, the scene is rendered normally comparing the depth of every point drawn (as if it were being seen by the light, rather than the eye) to this shadow map. The images may also be referenced in a recursive manner, as seen by the Processed Shadow Map example in the previous figure.

Planar reflections are also produced using an intermediate image. The entire scene is rendered inverted. The scene is generally rendered with a wide field of view. During the final render pass the inverted reflection map is blended with the shiny planar surfaces, as shown on the floor of the previous figure. A tree or directed a-cyclical graph (DAG) of the dependencies between these images can be formulated, an example of which is shown in FIG. 2. Each of the intermediate images must be rendered in an order that meets these dependency requirements. Because these dynamically generated images will be sampled as texture maps in subsequent render passes at unpredictable locations, the entire image is rendered. Often a significant portion of the computation and power consumption required to render the final image is spent producing these intermediate images.

However, typically only a portion of these intermediate images contribute to the final image.

Computation and Power Saving Opportunities Stream Sorting

An opportunity exists to reduce the computation and power by eliminating the overdraw work associated with occluded pixels. Analysis indicates that 15-20% of the computation in a common benchmark is extraneous overdraw. However, traditional approaches to addressing this issue involve performing a depth sort prior to processing the pixels. In this way only the pixels which are visible are actually processed. However, relatively large structures are required to store the unsorted pixels until all of the geometry that may influence the pixels is processed. When hardware is accelerating the depth sort process, these special purpose structures are integrated into the architecture and require significant area on the chip. The size of these structures is directly related to the quantity of geometry used to describe the scene. Hardware designers study the expected workloads for their device in order to select the optimal size of the structures.

Various forms of tile based rendering are typically used in order to further reduce the size of these structures and provide the added benefit of significantly reducing memory bandwidth. Because the image is spatially partitioned into small rectangular regions, known as tiles, and further because only the geometry that may affect this portion of the image is processed, the size of the depth sorting structures may be reduced. When possible, the contents of the tile sized depth buffer and sorting structures are never written into memory, thus saving substantial memory activity.

Reducing the size of these structures is acutely important because under-sized structures result in significant performance and power penalties. If the capacity of the structures is exceeded all of the processing that has been performed to that point is discarded and must be restarted using less efficient mechanisms. Attempts to avoid a catastrophic capacity failure or minimize the penalty of a failure often involve synchronization and communication with software, also costing time and adding complexity. Because of a strong trend toward increasing geometry complexity in the future, existing hardware solutions continue to grow these structures. They do not provide a graceful degradation of performance and power consumption under stressful conditions. A solution which attempts to gain the benefit of eliminating overdraw, must also elevate the existing penalties associated with increasingly complex content.

The "Stream Sorting" mechanism presented below attains the power saving benefits of minimized overdraw, while eliminating the special purpose depth sorting structures and providing a graceful degradation of performance under stressful geometry loads.

Reverse Rendering

Opportunity also exists for significant power savings in the rendering of intermediate images. Rarely does all of the information generated in the intermediate images contribute to the final image. This is primarily due to the fact that the intermediate images are sparsely sampled. Consider the sampling charts of three shadow maps used in a popular benchmark, shown in FIG. 3. When sampling is quantized to 4×4 blocks of pixels 13%, 55%, and 32% of the respective shadow maps contribute to the final image. Eliminating the extraneous work required to render the unused portions of the intermediate images provides an opportunity to reduce, and potentiality minimize, the overall computation and power consumption required to render the final image. In some cases this excess work comprises 50% of the total computation.

The mechanisms proposed below capitalize on this opportunity and are collectively referred to as "Reverse Rendering". Reverse Rendering, built upon Stream Sorting, significantly reduces computation and power consumption in a device.

Graph Execution

Stream Sorting and Reverse Rendering both depend on the ability of the architecture to configure the connectivity of the operations in a non-standard manner from a traditional rendering pipeline. These unique configurations are more generally termed a graph and apply to many more usage models than just those discussed here; for example, computer vision algorithms are particularly amenable to this capability, as can be seen in FIGS. 4A and 4B. An understanding of the approach employed by present architectures is helpful in understanding the significance of this invention.

Existing fixed rendering pipeline architectures simulate arbitrary graph execution by treating their existing fragment shader unit(s) as a single node in the graph. The device is programmed to perform a single operation. The input and output data associated with the processing node are stored in memory. In this manner the entire graph can be simulated, by programming the first node, processing all of the input data from memory and writing the output data for that node to memory. The device is then reprogrammed for the second node's operations, the output data from the previous node's buffer is read back from memory, computations are performed for the second node and the results are written to memory. This procedure continues until all nodes in the graph have been processed. Two key disadvantages of this approach are important. First, the often temporary data communicated between interior nodes is stored in memory, requiring significant power. Secondly, the CPU often must synchronize with the device in order to reprogram it for the next node's operations, costing time and power.

SUMMARY

A system for reducing power consumption, memory transactions and computation in graphics rendering, wherein the said system is caused to perform computations which contribute to a final image, which computations comprise rendering the image in reverse order wherein the said rendering further comprises projecting a plurality of texture coordinates from a current image back into a dependent image. The said computations further comprise performing a delayed visibility sort operation, filtering a computed plurality of pixel values; and projecting the computed pixel values comprised in the final image.

In a system for reducing power consumption and computation in graphics rendering, a method comprising performing of computations which contribute to a final image, which computations comprise rendering the image in reverse order wherein the said rendering further comprises projecting a plurality of texture coordinates from a current image back into a dependent image. The said computations further comprise performing a delayed visibility sort operation, filtering a computed plurality of pixel values; and projecting the computed pixel values comprised in the final image.

Stream Sorting and Reverse Rendering both depend on the ability of the architecture to configure the connectivity of the operations in a non-standard manner from a traditional rendering pipeline. These unique configurations are more generally termed a graph and apply to many more usage models than just those discussed here, as would be apparent to a person having ordinary skill in the art.

BRIEF DESCRIPTION OF THE DRAWINGS

FIG. 13 illustrates via a table, triangle index re-sequencing.

FIG. 14 illustrates line delineated block compression.

FIG. 17, TABLE 1 illustrates resources/properties associated with a node or nodes, and their respective functions.

FIG. 18, TABLE 2 illustrates a cache line read request that includes an address as usual, but also includes additional fields.

FIG. 19, TABLE 3 illustrates the size of a super-page and the entire layer which effectively provide strides that are used to address individual cache lines.

FIG. 20, TABLE 4 illustrates operations of an example embodiment.

FIG. 21, TABLE 5 illustrates a table of draw call sequence ranges provided to hardware.

DETAILED DESCRIPTION

Architecture

Figure 1A:
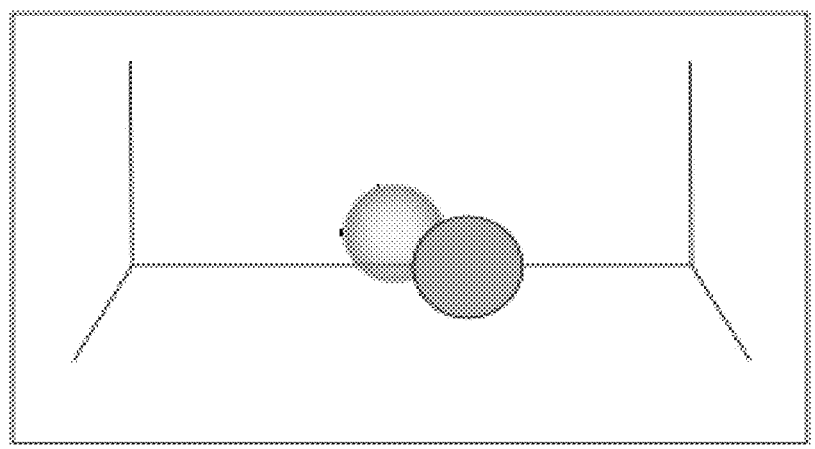
FIGS. 1A-C illustrates an embodiment of rendered synthetic 3D images.
Figure 1B:
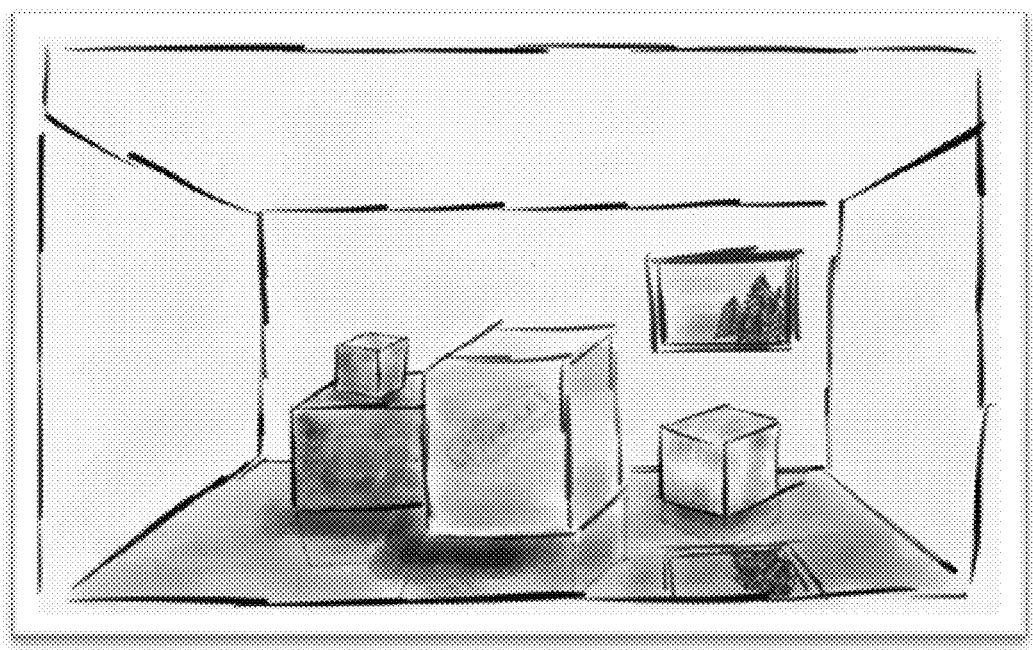
Figure 1C:
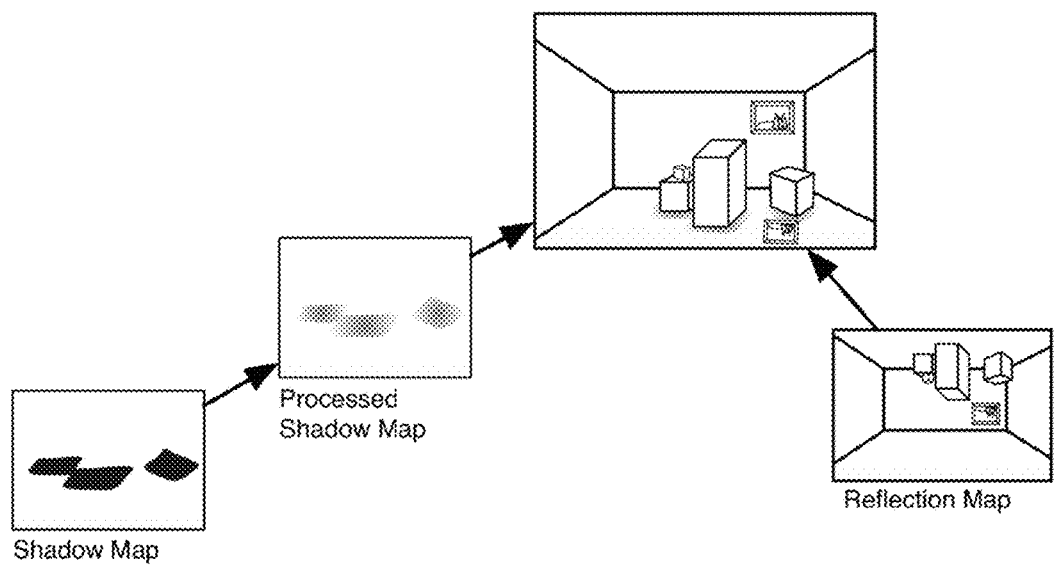
Figure 2:
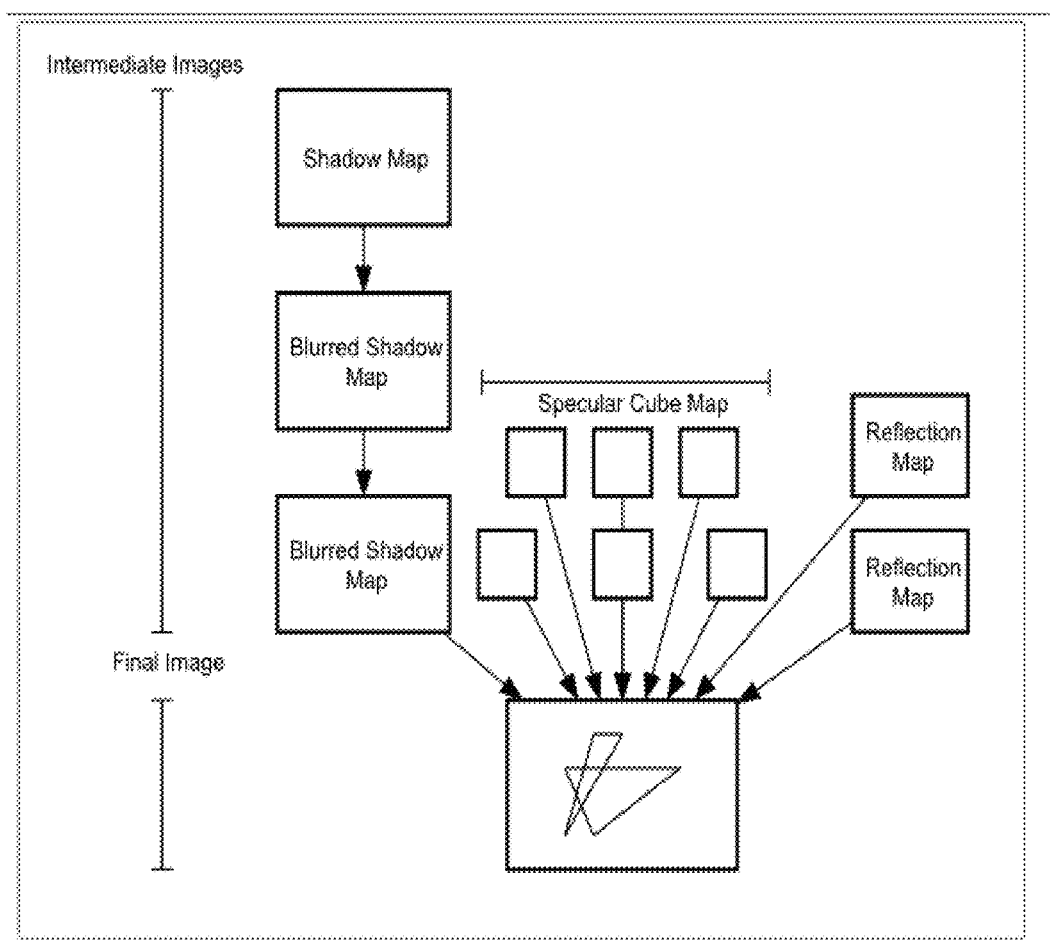
FIG. 2 illustrates rendering of intermediate 3D images.
Figure 3:
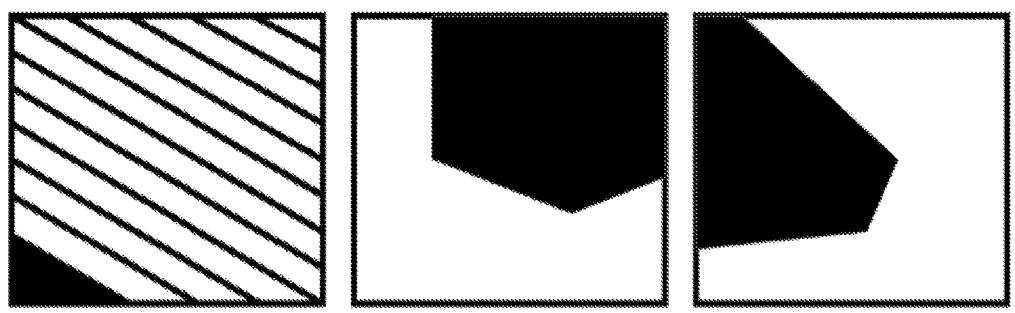
FIG. 3 further illustrates via a graphic, rendering of intermediate images.

A uniquely flexible and programmable architecture enables Stream Sorting and Reverse Rendering in a particularly efficient manner. Although this architecture is not the only method whereby Stream Sorting and Reverse Rendering may be implemented, nor are they exclusively dependent on this architecture, it provides an efficient framework for their implementation.

Flexible Processing Nodes

An embodiment of the system includes an architecture which comprises a plurality of logical nodes comprised in a single or plurality of stages, and connected together in an arbitrary topology. While the said nodes are logical, the stages are physical and each stage is capable of servicing multiple nodes. Preferably, the stages comprise means for providing strict ordering and data dependency tracking. Specific properties and resources are associated with each node. Many of the resources associated with a node have specific hardware support, which improves their behavior. For example, values from the Constant buffers are prefetched. These properties and resources provide each node with tremendous flexibility for performing graphics related tasks or more general purpose operations. These properties further can provide each said node with flexibility for performing other applications like computer vision, video and image processing, high performance data parallel computing, etc. Other variations are possible and even desirable, as would be apparent to a person having ordinary skill in the art. An example embodiment, shown in TABLE 1, illustrates resources/properties associated with a node or nodes, and their respective functions.

Special Purpose Nodes

For performance reasons, certain operations may require specialized fixed function hardware, such as a Rasterizer. Other special operations, such as texture sampling and various mathematical operations are not exposed as nodes, but are accessible directly through instructions. These special purpose modules conform to the same interface requirements as the other more flexible nodes, thus allowing them to seamlessly integrate into a consistent and homogeneous architecture.

Inter-Node Communication

Execution commands and synchronization between nodes is accomplished through Command buffers, while data is delivered through Input and Output buffers. Importantly, all control information and input/output data is delivered through buffers, which have a memory image. The architecture essentially retains no device state exclusively in registers on chip. This includes both internal and external control, which are formulated as commands sent between the nodes.

The input and output data, which is communicated between nodes, is similarly delivered through memory buffers; however, these buffers are managed by the device so as to be much smaller than would be required if the entire output from a node were stored in memory. The buffers are treated as ring-buffers, which utilize addressing that wraps to the beginning of the buffer once the end has been reached. Because the buffers need only hold sufficient data to stream the temporary data between nodes in the graph, the buffers often reside in the on-chip caches, greatly reducing the power consumption associated with DRAM memory transactions.

The data in the caches may also be explicitly invalidated using either commands placed in the command buffer or instructions placed in the programs. The caches may be selectively invalidated for all data contained within a rectangular area in a single clock cycle. This explicit invalidate mechanism provides increased control over the memory hierarchy and results in reduced power consumption.

The memory buffer approach enables low latency context switches that are fully pipelined. No sequential load/unload of the current context is required. Multiple contexts may operate concurrently in the device.

A Context

Figure 4A:
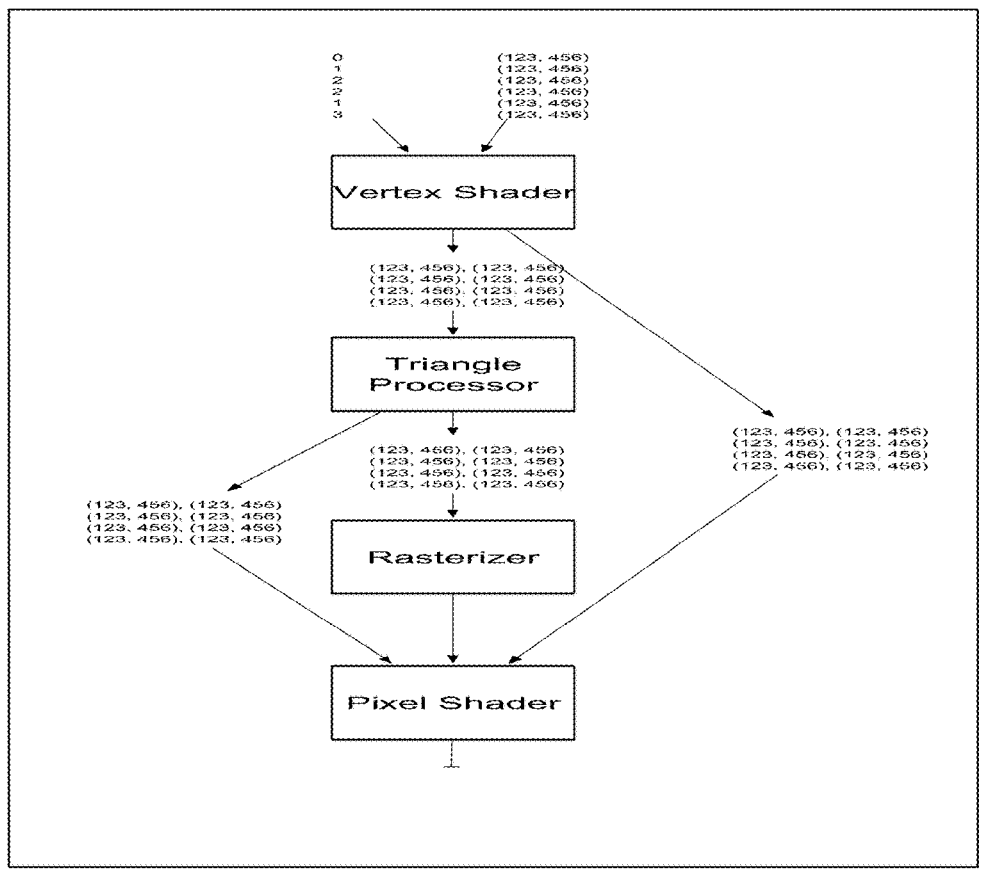
FIGS. 4a-4b illustrates reconfigurability for a traditional 3D pipeline and for Scale Invariant Feature Transform (SIFT).
Figure 4B:
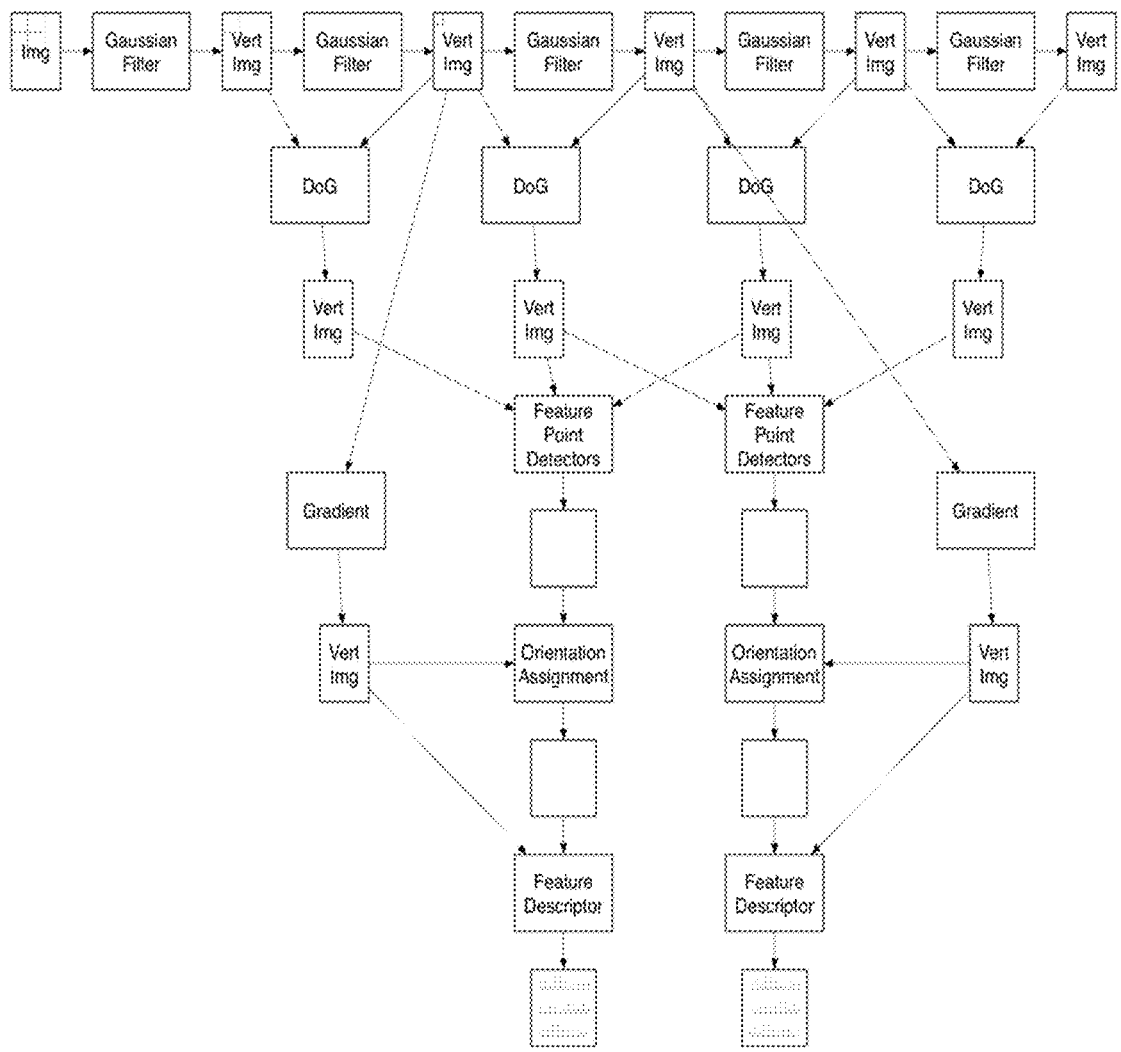

According to an embodiment, a particular combination of nodes, with their properties and resources defined, that are connected in specific topology and bound to an initial command buffer, form a "Context". Different Contexts may be defined to perform 3D rendering for particular specifications. For example, a simple Context can be defined to support the OpenGL ES 2.0 standard, while a different Context might also be defined for the DirectX 11 specification, which contains several more stages. Significantly, Contexts may also be defined for non-rendering based problems, such as the Scale-Invariant Feature Transform (SIFT), a common computer vision operation for recognizing objects. FIGS. 4A and 4B demonstrate this reconfigurability for a traditional 3D pipeline and for Scale-Invariant Feature Transform (SIFT).

These architectural decisions result in the several advantages over more traditional 3D rendering hardware and are of particular value for Stream Sorting and Reverse Rendering. Embodiments disclosed include flexible nodes or stages, allowing for varied and programmable functionality. Custom contexts allow for a single or plurality of alternate rendering pipelines, and multiple concurrent contexts allow for sharing of compute resources while performing different tasks. Applying these concepts to the power and compute saving opportunities described above is the primary focus of the remainder of this document.

Stream Sorting

Figure 5:
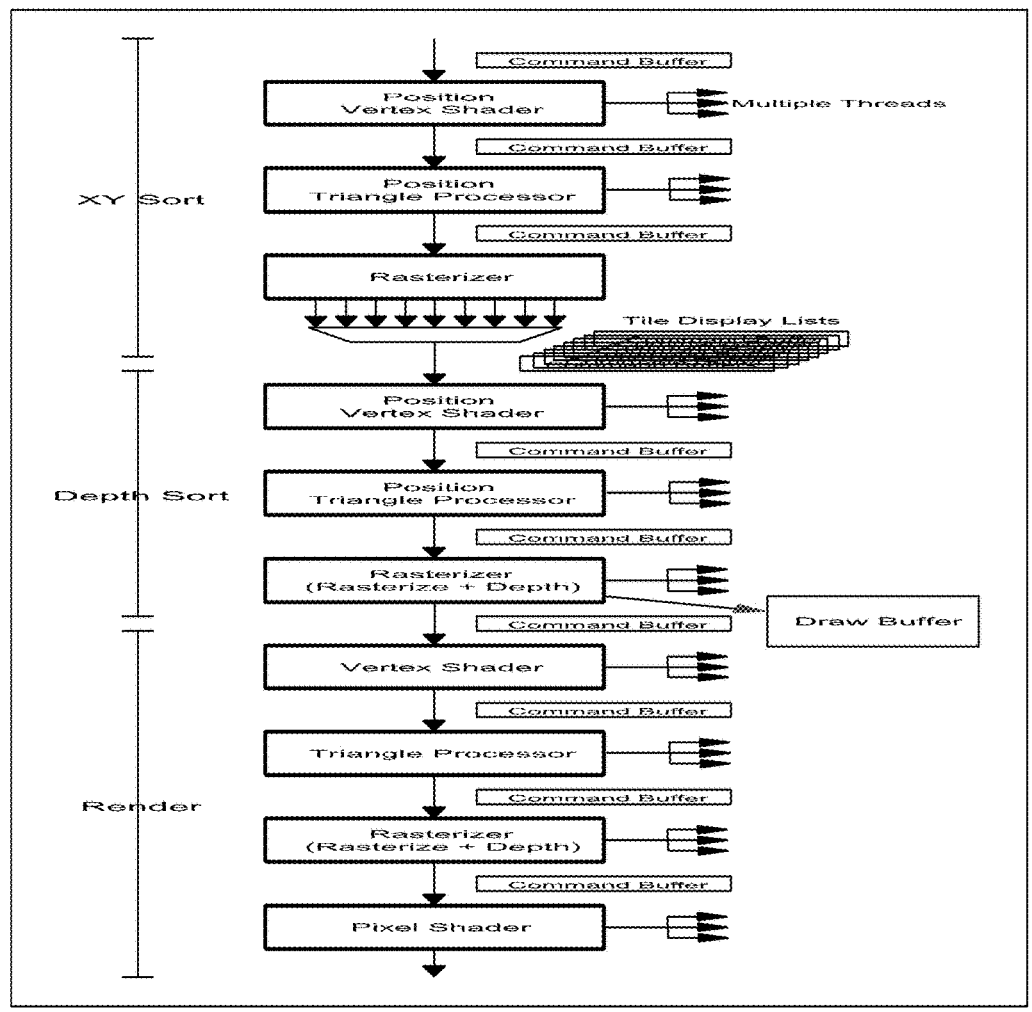
FIG. 5 illustrates Stream Sorting and Reverse Rendering utilizing an alternate rendering pipeline.

Stream Sorting and Reverse Rendering utilizes an alternate rendering pipeline, shown in FIG. 5. The pipeline is divided into three phases entitled XY Sorting, Depth Sorting and Rendering.

XY Sorting Phase

The purpose of the XY Sorting phase is to sort the streams of triangles into a collection of Tile Display Lists. Each list is actually a Command buffer, as described in the section "INTER-NODE COMMUNICATION" above, which identifies the geometry that potentially modifies the content of the tile.

The vertices need to be transformed into screen space in order to perform the triangle-tile intersection test. This is accomplished by executing a factored version of the Vertex Shader and Triangle Processor kernels, which computes only the position related outputs. Typically back-facing triangles, and other clipped or non-visible triangles, are discarded at this point.

The original index into the vertex buffer, for each vertex of a triangle, is forwarded through the Triangle Processor to the Rasterizer. The Rasterizer then iterates over the triangle to determine which tiles it intersects. A command referencing the original vertices is inserted in the Command buffer for each intersecting tile. This allows the original vertex buffer to be used in subsequent phases and eliminates the need to write out the transformed vertices and their new indices. This results in additional computation, but saves memory bandwidth.

Once all of the geometry has been sorted, the individual Command buffers are passed onto the next phase. However, if the Command buffer for a particular tile becomes full the buffer is simply processed immediately. This simple solution avoids the complexities associated with attempting to expand the Command buffer size or chaining it to another buffer. It also avoids the latency of a software interrupt, if memory pages aren't available for buffer expansion. With the ability to define an alternate rendering pipeline, the complexities and performance penalties are simply avoided.

Depth Sorting Phase

The Depth Sorting phase performs the traditional hidden surface depth test to determine which triangles potentially influence the final image. This is accomplished by processing each Tile's Display List (the tile's Command buffer) using the same position factored versions of the Vertex Shader and Triangle Processor kernel. The Rasterizer then iterates each triangle, performing the per pixel depth test. Any triangle which passes the depth test will be written into the output Command buffer. It is possible for triangles to be written into the output Command buffer that do not actually contribute to the image. This occurs when the geometry is processed back to front. However, the depth test performed in the Rendering phase will discard any pixels that do not ultimately contribute. Finally, when applicable, a Reverse Rendering Draw Buffer, which identifies contributing triangles, is generated in this phase for intermediate images rather than the output Command buffer. This buffer and its usage is described in detail in a subsequent section.

Rendering Phase

The rendering phase processes the Command buffer from Depth Sorting phase as the contributing triangles are identified for the tile. In this manner the triangles are streaming into the Rendering phase. The complete Vertex Shader and Triangle Processor kernel are executed. Because the fully updated depth buffer is still resident in the cache, the depth test performed in the Rasterizer will be efficient. It will also limit the pixel processing to only those pixels which contribute to the image.

Stream Sorting has eliminated unnecessary pixel processing due to object occlusion and contained the depth buffer memory bandwidth to on-chip caches, thus significantly reducing the power consumption of the device.

Reverse Rendering

Reverse Rendering is the general concept of rendering the final image first while recursively projecting backward into the intermediate images and rendering only those portions which contribute. Several mechanisms for realizing this benefit, within the context of 3D rendering hardware and software, are presented. The somewhat simple approaches described in the initial sections provide the foundational concepts for the increasingly more efficient techniques which follow.

1.1 Display List Based Approaches

A display list consists of multiple Draw commands, which describe the triangles to be rendered to the current image. Additionally, the display list contains state changes and bindings to various resources, such as constants and texture maps. The color of each pixel in an image can be traced back to one or more triangles in the display list and their state bindings. Individual pixel values may be computed by processing a subset of the display list and by constraining the image updates to the pixels of interest. The first approach is somewhat simplified, ignoring Stream Sorting, but provides the foundational concepts for the remaining approaches.

1.1.1 Complete Display List Approach

Figure 6:
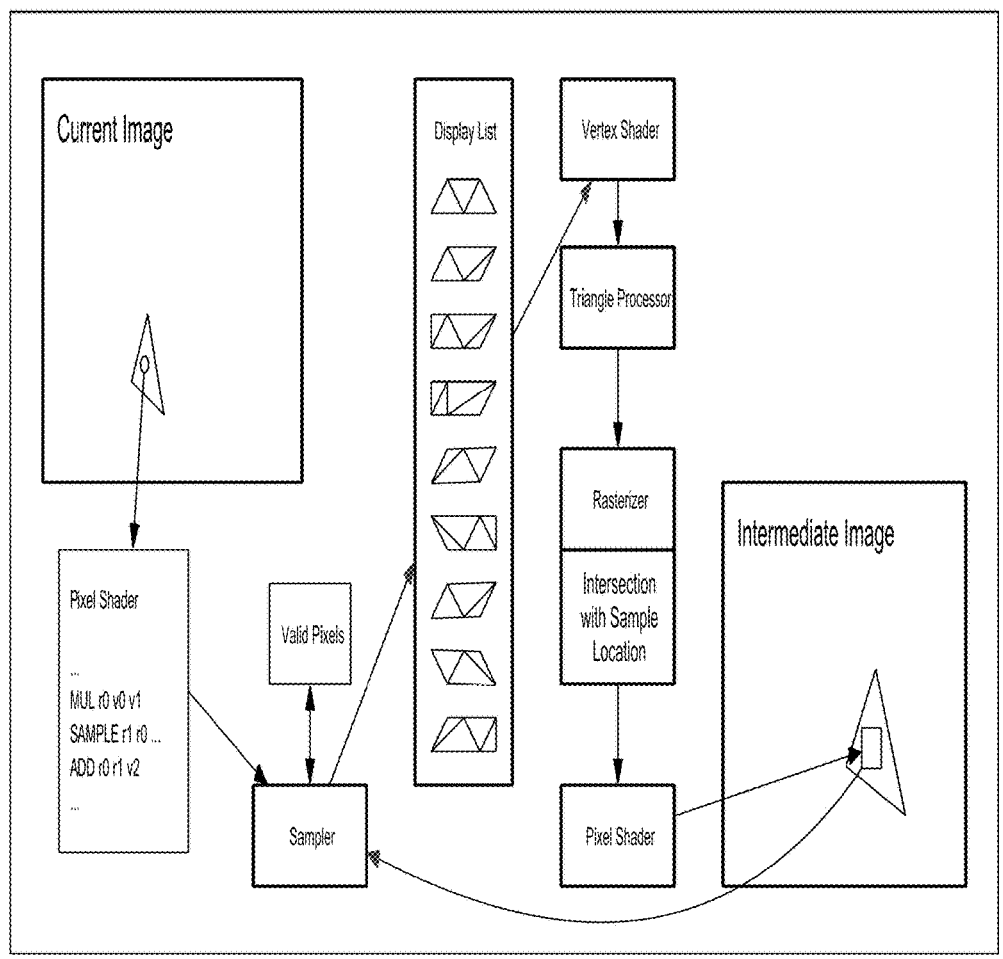
FIG. 6 illustrates reverse rendering using display list based approaches.

FIG. 6 illustrates the complete display list approach in an embodiment. The application, that assembles the display list and its' state, delivers the commands to a software driver through a standardized application interface. The driver retains the display lists for later processing without servicing the commands. When the final image's display list is presented to the driver immediate mode rendering proceeds normally, with one exception. The SAMPLE instructions, embedded in the pixel and vertex shading programs of a traditional 3D rendering pipeline, must not trivially sample a dynamically rendered intermediate image, because the necessary pixel values may not yet have been computed.

The Sampler unit in the hardware, which services the SAMPLE instructions as is shown below, verifies that the sample location in the bound texture map contains valid data. The filtering neighborhood, along with the sample location provides the area of the intermediate image that needs to be valid. This is accomplished by managing a simple memory resident bit-map of valid pixels. If the pixels are valid then the Sampler proceeds normally. However, if all of the needed pixels are not valid then the Sampler proceeds to insert new work into the pipeline, such that the pixel values will be computed. Once this is completed the bit-map of valid pixels is updated.

When the pixel values need to be computed the display list for the intermediate image, referenced in the SAMPLE instruction, is processed through the Vertex Shader, Triangle Processor and Rasterization stages to determine which triangles intersect the needed pixels. Only the triangles of interest are passed to the Pixel Shader stage. Pixels are further constrained to lie within the region identified by the sample location and the filter neighborhood. In this manner, the pixel processing is performed for only those pixels which are sampled by the current image.

Finally, the Stream Sorting mechanism eliminates overdraw in the current image, such that only the contributing pixels are computed in the intermediate image, thus minimizing the computation and power consumption requirements.

However, processing the entire display list down through the Rasterization stage for each SAMPLE instruction is extremely inefficient. The next section addresses this issue.

1.1.2 Tile Based Display List Approach

Tile based rendering divides an image into many rectangular regions, called tiles, and pre-sorts the triangles in the original display list into separate smaller tile display lists, based on the tiles they intersect. This is accomplished by processing the display list, typically just the vertex position information, through the Vertex Shader and Triangle Processor. At this point in the pipeline the screen space positions of the triangles are known and the tile display lists are generated. These lists often reference the original display list for the remaining vertex attributes. They may also contain or reference additional temporary information, such as various geometry gradients, in order to save future computation.

Figure 7:
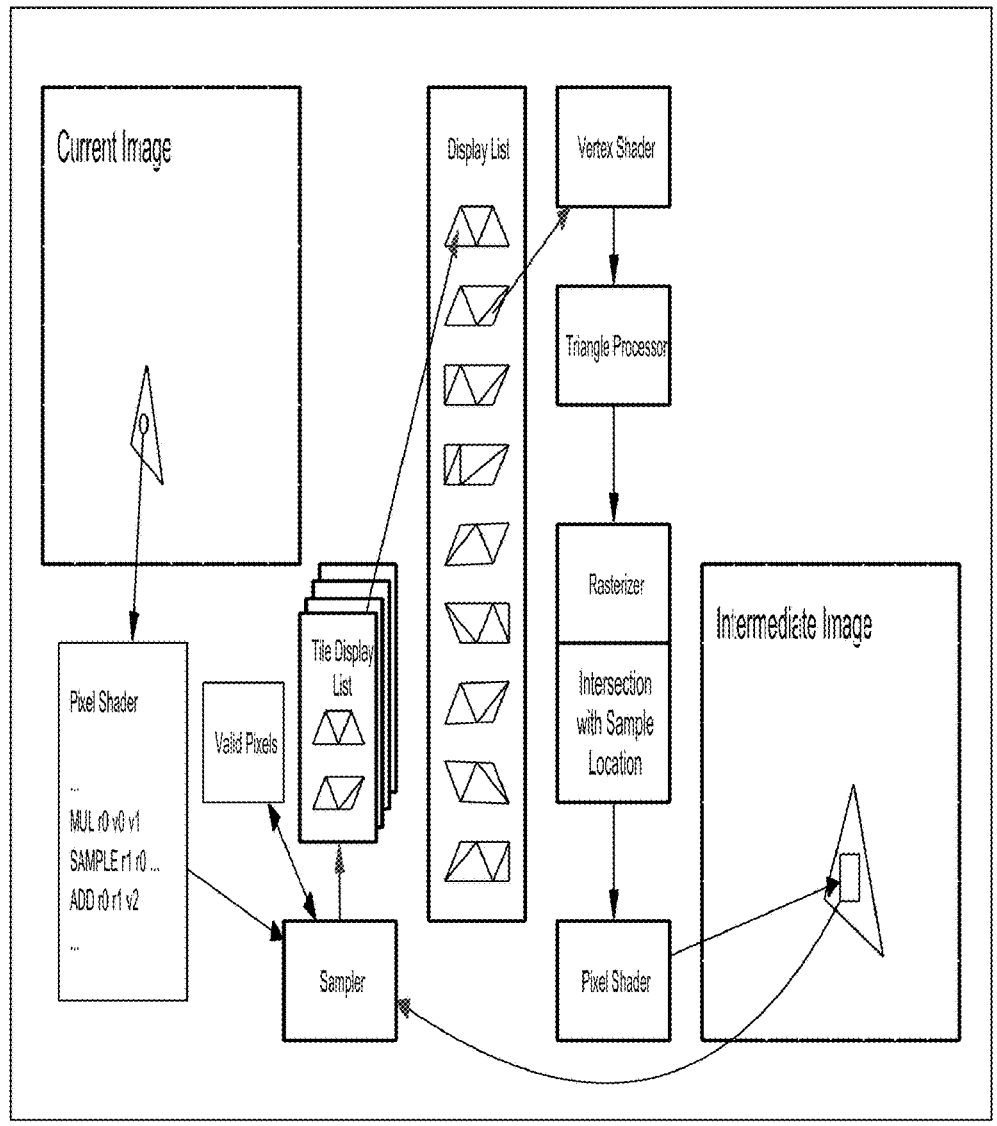
FIG. 7 illustrates reverse rendering using tile based display list approaches.

The process of Reverse Rendering is much the same as the Complete Display List approach above, except that only the intersecting tile's display lists need be processed. For example, as is shown in FIG. 7, two tile display lists would be processed, because the sample location and filter neighborhood, identified by the blue square in the intermediate image, intersects two tiles. This approach significantly reduces the geometry processing load.

Figure 16:
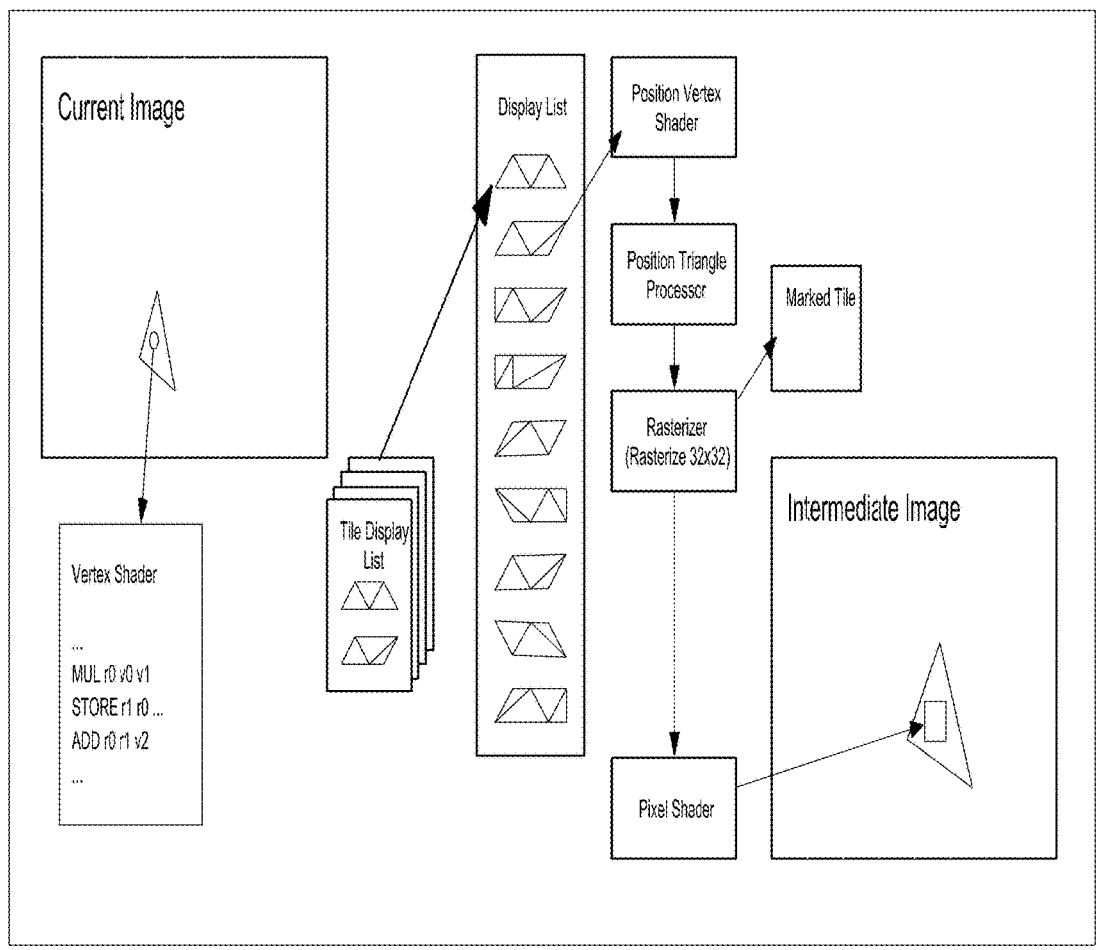
FIG. 16 illustrates pre-marking of tiles that potentially contribute to the final image, by processing only the vertices for each render pass in reverse order.

The tiles may also be pre-marked as potentially contributing to the final image, by processing only the vertices for each render pass in reverse order, as shown in FIG. 16. Any pixel shader operations on dependent texture coordinates must be appended to the vertex shader. The vertices of each triangle form a bounding area, for which all intersecting tiles are marked as being needed. Only triangles who's fragment shaders access dependent textures and who themselves lie within previously marked tiles need be processed. This process proceeds recursively through each render pass; after which, the marked tiles' display lists are rendered in the normal stream sort manner.

These approaches are not optimally efficient because the size of the tiles is typically much larger than the size of the filter neighborhood, which results in potentially unnecessary computation. However, reducing the tile size increases the overhead cost of the tile display lists.

1.2 Texture Coordinate Storage Approach

Figure 8:
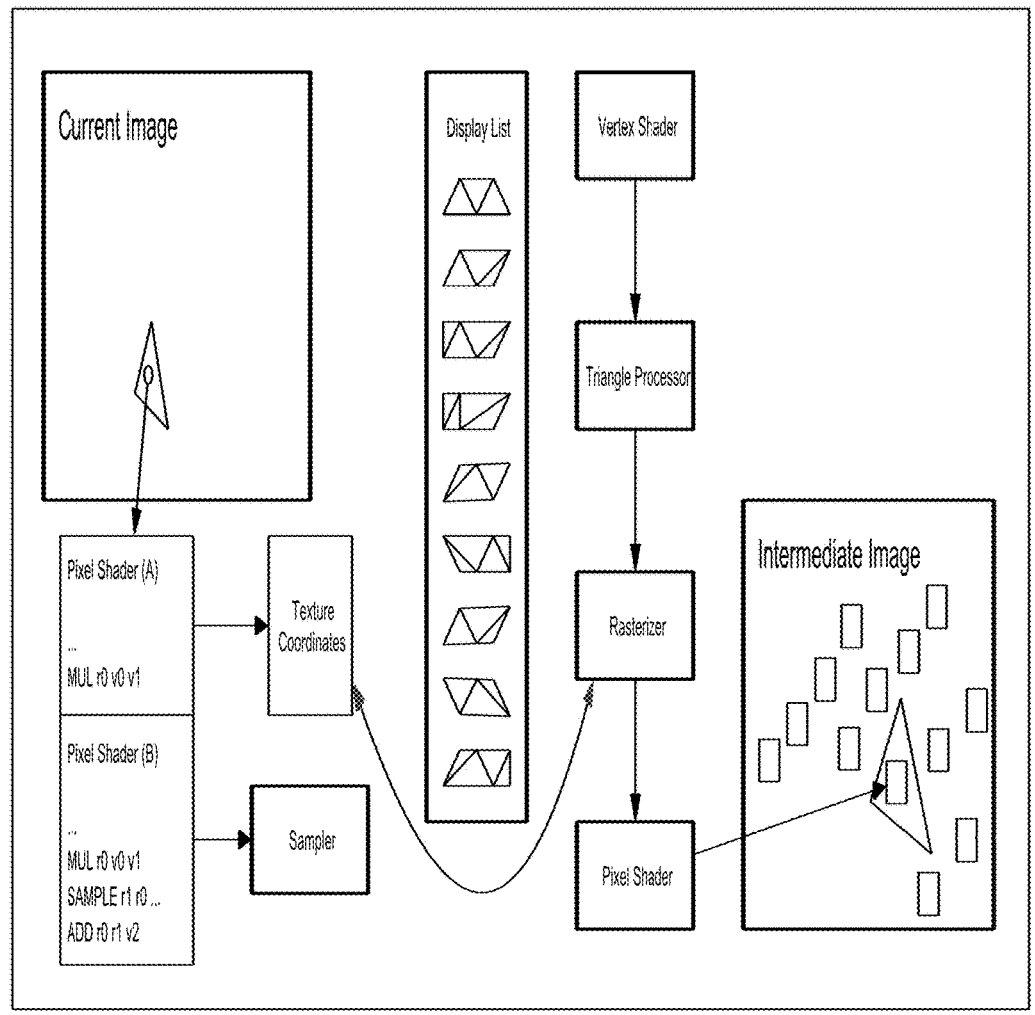
FIG. 8 illustrates reverse rendering using texture coordinate storage approaches.

An approach which stores the texture coordinates that are used to sample an intermediate image is depicted in FIG. 8. In this approach the pixel shader is divided into segments based upon the location of the SAMPLE instructions which sample an intermediate image. In a multi-pass manner the draw-calls for the current image are reissued, each time with the next segment of the pixel shader appended. However, in between each pass the Display List for the referenced intermediate image is processed, checking that the pixel locations of the triangles fall within the areas specified by the list of texture coordinates. These areas are indicated by the small blue squares in the diagram. In this way only the areas of the intermediate image that will be sampled in the next pass of the current image are computed.

This approach does not switch between the current image and the intermediate image as frequently, which reduces the cost of hiding the latency between switches. Caches can be reduced in size with this approach; however, the bandwidth costs of storing and searching the list of texture coordinates is quite high.

1.3 Draw Buffer Approach

Figure 9:
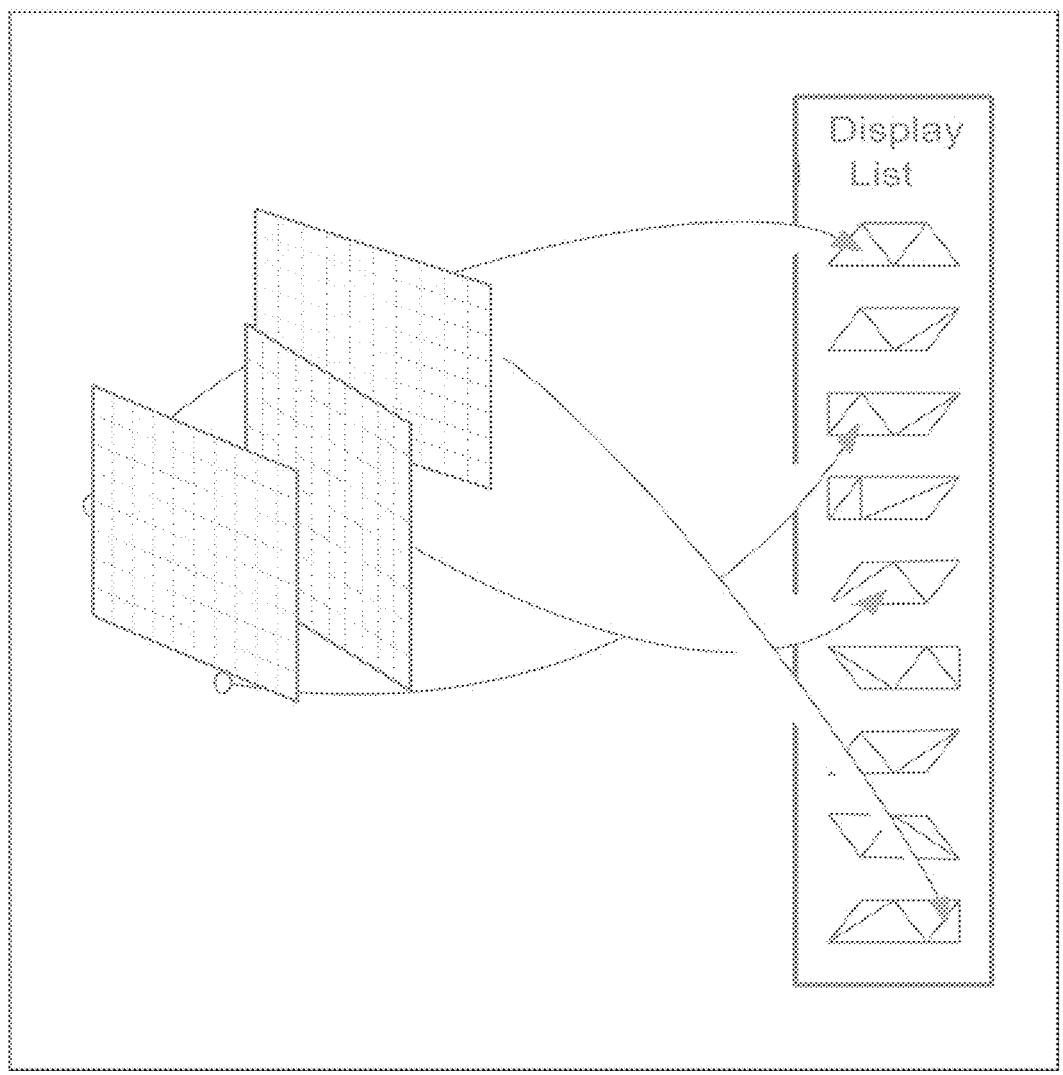
FIG. 9 illustrates a draw buffer approach.

An approach which minimizes both the cost of identifying the specific triangles that contribute to a pixel and retains fine granularity of the computation size, employs a new structure called a Draw Buffer. A Draw Buffer is a sparse, three dimensional, dynamically sized, memory resident structure, which provides references to the contributing triangles for each pixel in an image. FIG. 9 shows an example image with specific pixels labeled A and B. Pixel A's value is determined solely by a single triangle from the display list. The Draw Buffer contains a reference to this triangle. Conversely, pixel B's value is determined by the contributions of three triangles, typically due to blending between the triangles. The Draw Buffer contains references to all three triangles in a specified order. The Draw Buffer replaces the functionality of the display lists in the approaches from above.

1.3.1 Generating a Draw Buffer

Figure 10:
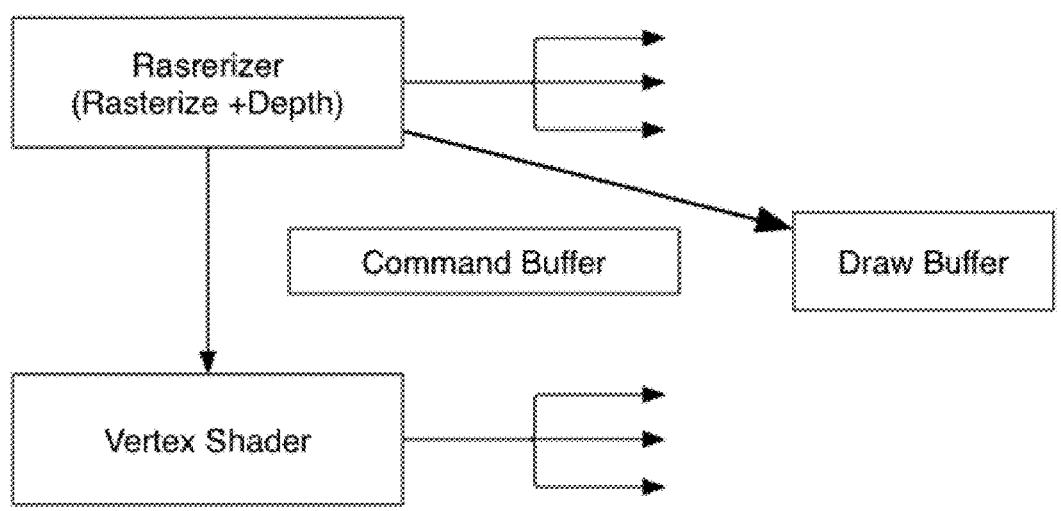
FIG. 10 illustrates generating a draw buffer.

When processing an intermediate image, a Draw Buffer is generated at the output of the Rasterizer node, as shown in FIG. 10. Opaque primitives over write the list of contributing triangles in the Draw Buffer, while translucent primitives append their triangle ID to the list. A hardware mechanism for dynamically managing the storage of data in a Draw Buffer is important to reduce its memory size.

1.3.1.1 Dynamic Memory Objects

Figure 11:
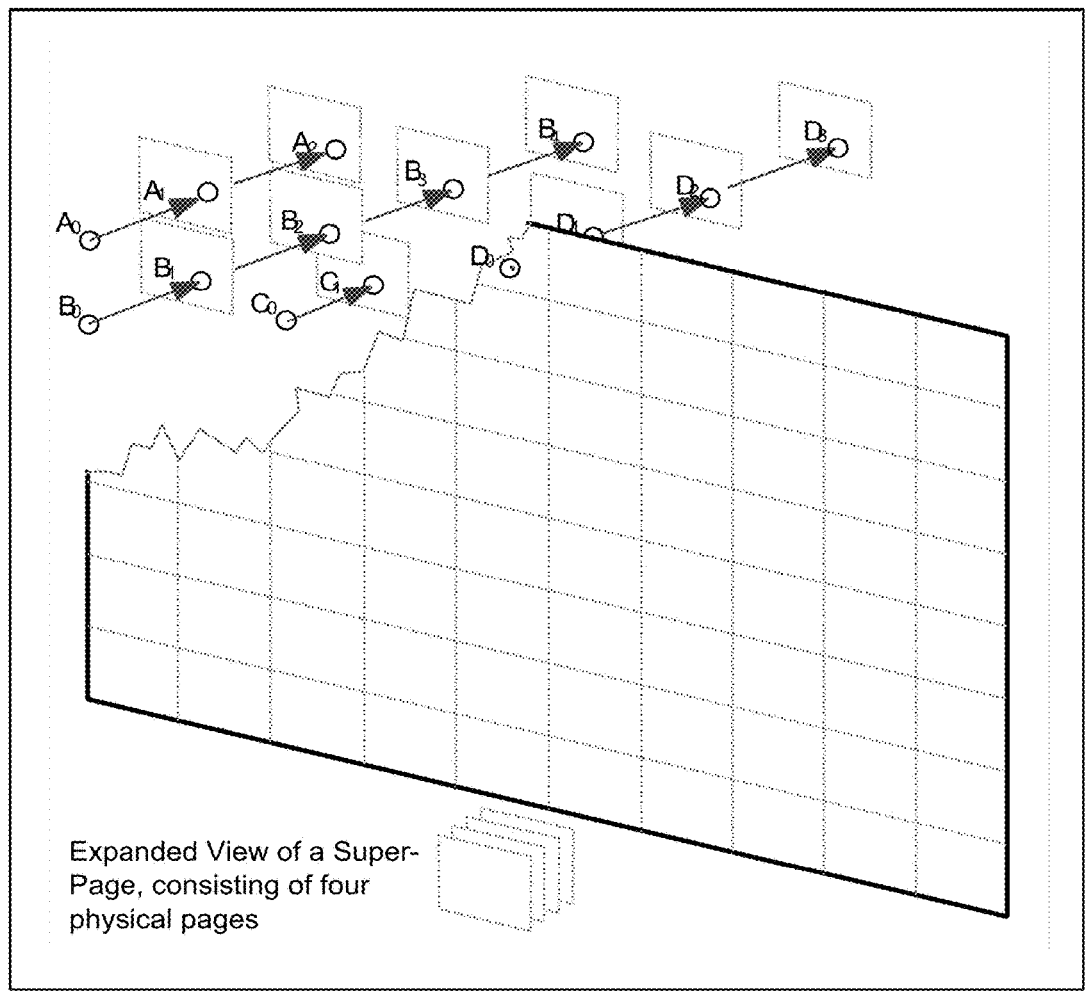
FIG. 11 illustrates dynamic memory objects.

FIG. 11 shows a dynamic memory object, addressed as a three dimensional entity, where the last dimension is dynamically and sparsely allocated by the hardware. Each layer consists of a two dimensional array of super-pages. A super page is a collection of virtually contiguous pages, as shown at the bottom of FIG. 11. The dashed line rectangles shown in the first layer of the diagram each represent a super-page. The cut-away reveals sparsely allocated pages for each layer of a super page at several different locations. For example, point A lies within a super-page which has three layers, while B contains five layers. At locations C and D two layers and four layers are allocated, respectively.

A cache line read request includes an address as usual, but also includes additional fields, shown in TABLE 2. The Super-Page address is the traditional cache line address, while the Page Index selects the specific page within the super-page. Finally, the Layer Index selects the appropriate layer within the object.

A few additional fields are also needed to compute the complete address within the object. The size of a super-page and the entire layer effectively provide strides that are used to address individual cache lines, shown in TABLE 3.

Additional memory operations are supported on dynamic memory objects, which provide support for more advanced operations, such as initializing memory and appending pages to the sparse structure.

The operations of an example embodiment, shown in TABLE 4, require specific hardware support. The process of allocating a new page is handled completely by hardware. Initially a sufficient number of pages are obtained, from a pool of available physical pages, for super-pages. The Translation Table entry for the first page of the first layer is read to obtain the number of layers currently allocated. The number is stored in the lower bits of the physical address. This number is incremented. The physical addresses for each of the pages within the super-page are copied to the last layer and the new pages are written to the first layer. In this way the layers are ordered except for last layer, which is always stored in the first physical layer. This provides a mechanism such that the append operation requires only two memory transactions in the Translation Table. Read and write operations also utilize the layer count to determine if a request is out of bounds.

Dynamic memory objects provide significant memory foot-print benefits for Draw Buffers.

1.3.2 Rendering with a Draw Buffer

During Reverse Rendering, the execution of a SAMPLE instruction produces the same valid pixel check in the Sampler Unit as previous approaches, although the valid bits are stored in the Draw Buffer. When additional computation is required, only the contributing triangles are processed. The Draw Buffer's triangle indices reference the tile display list, which also references the original display list. The contributing triangles are inserted into the pipeline in the order specified by the Draw Buffer. Only the necessary pixel values are computed. The newly computed pixels are then sampled, filtered and returned to the shader program. This fine grained approach reduces the amount of unnecessary geometry processing, while also minimizing extraneous computation of pixel values in the intermediate image. Another advantage of computing the pixel values just prior to their usage by the Sampler Unit is that it is very likely to be resident in the cache, and will not require a memory transaction and the power consumption that such a transaction entails.

Figure 12:
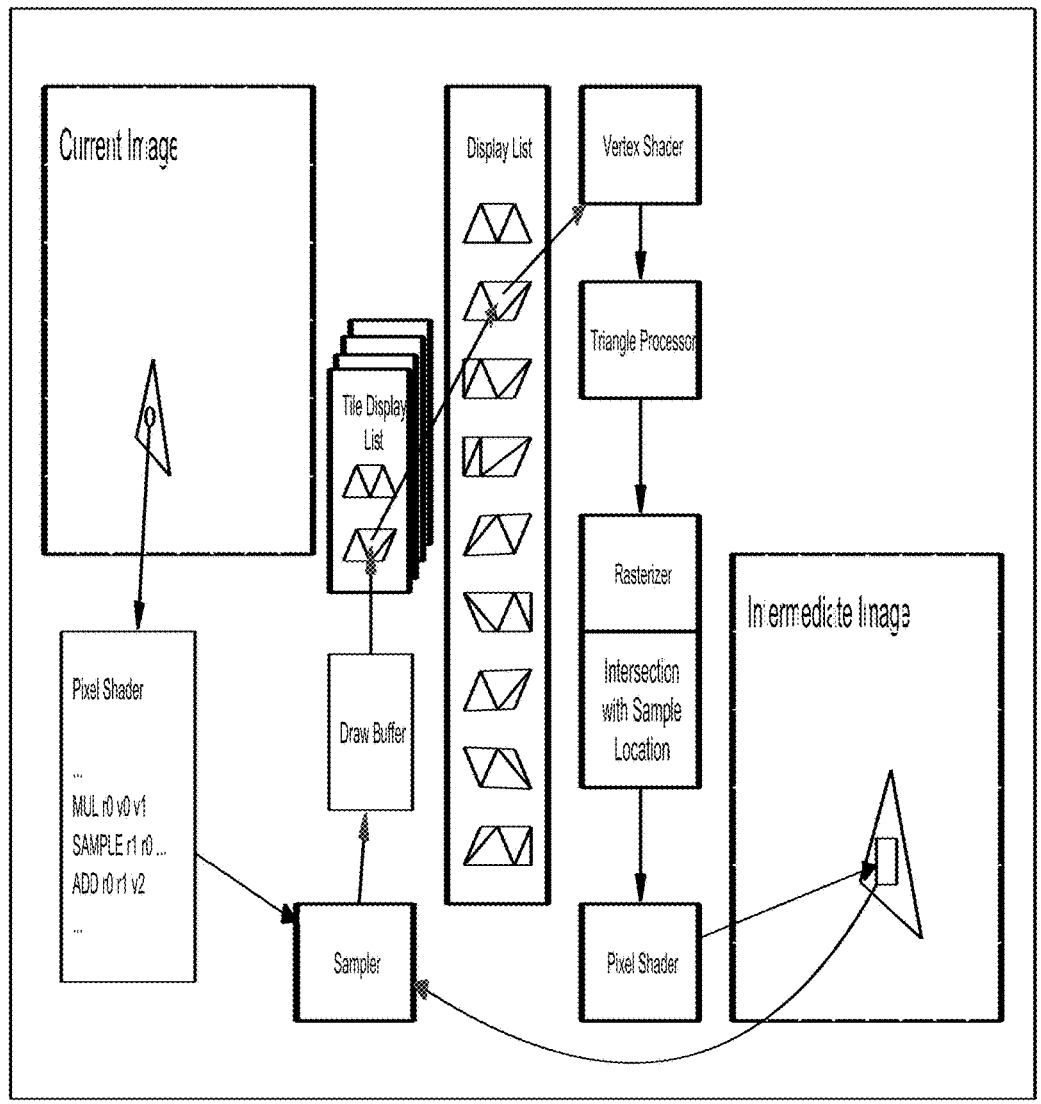
FIG. 12 illustrates rendering with a draw buffer.
Figure 15:
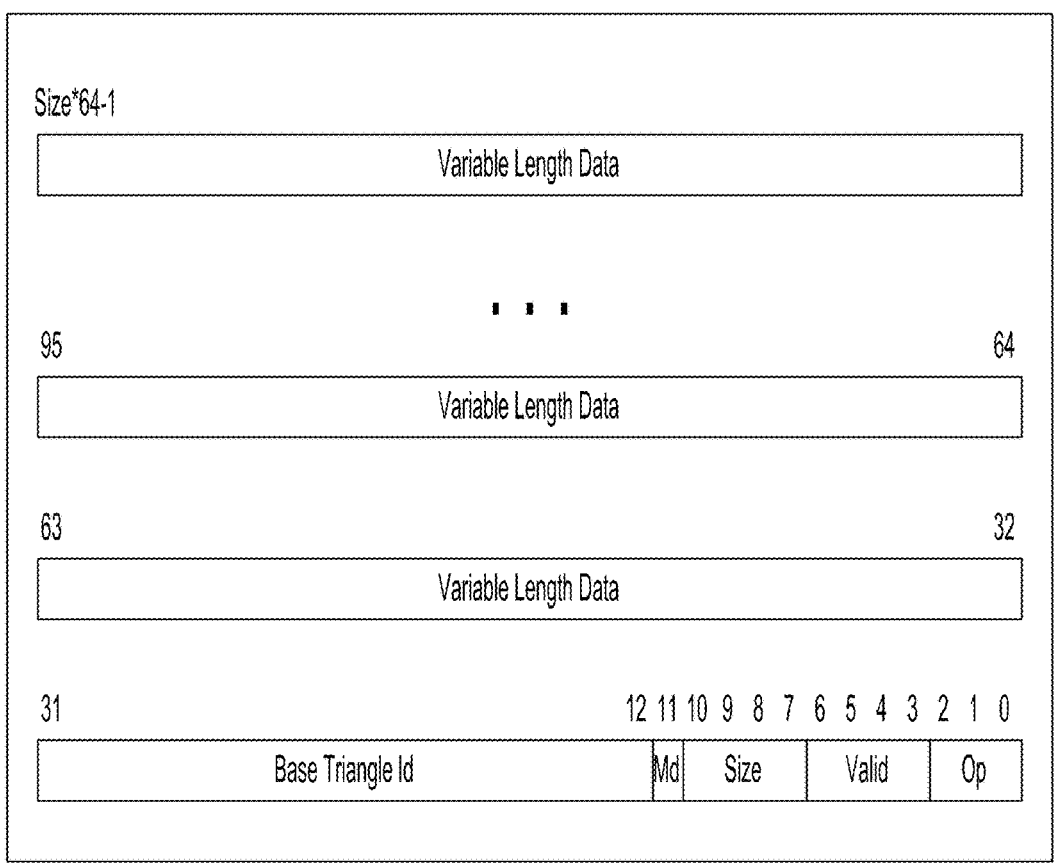
FIG. 15 illustrates compression blocks.

The Draw Buffer approach provides a significant improvement over the previously considered approaches as is shown in FIG. 12. However, because this approach fundamentally trades-off increased memory bandwidth for computational efficiency, mechanisms for compressing the Draw Buffer are now considered.

1.3.3 Draw Buffer Compression

Storing a draw-call index and a triangle index in each element of the Draw Buffer is a simple structure that provides relatively direct access to the display list. A 16-bit value can safely be used for the draw-call index; however, a 32-bit value is required for the triangle index. Naively storing 48-bits per element in a fixed multi-dimensional array is unlikely to be acceptable, because of the large memory foot print and bandwidth.

1.3.3.1 Triangle Index Resequencing

According to an embodiment, a mechanism for assigning a frame level sequence number or ID to each triangle is helpful, because it can frequently be stored in 16-20 bits. The necessary precision can be determined in advance by the driver. However, an inverse translation function is required, which will convert back to a draw-call offset and triangle index. This is accomplished by providing the hardware with a table of draw call sequence ranges, similar to that shown in TABLE 5. This table is searched to find the draw-call containing the triangle sequence number and the residual value becomes the triangle index number. The Display List Offset column provides the relative starting location for the state bindings and the draw-call commands within the display list. This simple re-sequencing technique typically provides a 3:1 compression ratio.

1.3.3.2 Block Based Compression

Draw Buffers generally benefit from block based compression techniques, because of significant coherency among the triangle Id's. Analysis has shown that for scene based intermediate images, approximately 75% of all 8×8 blocks contain only two unique triangle Id's. However, certain geometrically dense intermediate images, such as shadow maps, which tend to be projected from articulated figures, contain many more unique triangle Id's. This bimodal behavior suggests a hybrid mechanism is therefore preferable, where an opcode identifies the type of compression employed by each block. An 8×8 block is assumed for the following compression methods.

Line Delineated Block Compression

When it has been determined that a block is bisected by a single line (FIG. 13) with all of the pixels on one side of the line originating from one triangle and similarly on the other, a highly efficient compression technique may be utilized according to an embodiment. This technique may also be employed when the block is completely covered by a single triangle. The compressed block may be encoded in a manner similar to the layout shown in FIG. 14. An Opcode identifies the type of compression utilized on the block. Four Valid bits specify which quadrants of the 8×8 are valid and thus encoded. Two 16-bit Triangle Id's are stored in half of the compressed block. The remaining fields describe the slope and position of the bisecting line. The X field indicates that the slope is increasing in the x direction faster than in the y direction. The Edge field identifies the edge from which the Intercept and Slope values originate. Identifying the specific intercept edge reduces the precision requirements for Slope field. When usable, this mechanism provides a 16:1 compression ratio.

Golomb/Rice Variable Length Coding

A lossless compression technique is employed for more complex blocks. The usual Opcode and Valid fields are present, along with a Size field indicating the size, in 64-bit words, of the variable length block. The Base Triangle ID provides the starting value for the Golomb/Rice encoded delta values. The Mode (Md) field indicates the k value (the number of unencoded least significant bits) between two optimally chosen values. This form of encoding typically produces approximately a 4:1 compression ratio.

Compression of the Draw Buffer is important for reducing the overall bandwidth associated with Reverse Rendering and achieving the desired power savings.

1.3.4. Buffer Clearing

With the use of a Draw Buffer the clear operation is not required. The zero triangle ID is reserved to indicate a cleared pixel value is stored in the image; however, the actual value need not be written because the Draw Buffer carries the needed information. The clear value for each intermediate image is stored in state and returned to the sampler directly, without passing though memory. The result returned from the sampler will simply be the state clear value.

The four basic approaches discussed for performing Reverse Rendering generally increase in complexity, but also the degree to which power consumption is reduced. It is conceivable that a path through multiple approaches may be traversed in order to achieve the most optimal solution as would be apparent to a person having ordinary skill in the art.

With Stream Sorting eliminating overdraw and Reverse Rendering eliminating unnecessary computation in intermediate images the power consumption required to render modern synthetic 3D images is dramatically reduced. Additionally, the bandwidth savings afforded by Stream Sorting also significantly reduces power consumption.

Since various possible embodiments might be made of the above invention, and since various changes might be made in the embodiments above set forth, it is to be understood that all matter herein described or shown in the accompanying drawings is to be interpreted as illustrative and not to be considered in a limiting sense. Thus it will be understood by those skilled in the art that although the preferred and alternate embodiments have been shown and described in accordance with the Patent Statutes, the invention is not limited thereto or thereby.

The figures illustrate the architecture, functionality, and operation of possible implementations of systems and methods according to various embodiments of the present invention. It should also be noted that, in some alternative implementations, the functions noted/illustrated may occur out of the order noted in the figures. For example, two blocks shown in succession may, in fact, be executed substantially concurrently, or the blocks may sometimes be executed in the reverse order, depending upon the functionality involved.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In general, the steps executed to implement the embodiments of the invention, may be part of an automated or manual embodiment, and programmable to follow a sequence of desirable instructions.

The present invention and some of its advantages have been described in detail for some embodiments. It should be understood that although some example embodiments of the stream sorting and reverse rendering mechanism, system, and method are described with reference to 3 dimensional graphics processing, the system and method is highly reconfigurable, and embodiments include reconfigurable systems that may be dynamically adapted to be used in other contexts as well. It should also be understood that various changes, substitutions and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, and composition of matter, means, methods and steps described in the specification. A person having ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

The invention claimed is:

1. A system for reducing power consumption comprising:
a rasterizer;
a triangle processor;
at least one electronically reconfigurable processor and a non-transitory electronically accessed memory storage element coupled to the said processor;
encoded instructions stored in the said storage element, when implemented by the said processor configures the said system to reduce memory transactions and computation in graphics rendering, wherein the said system is further caused to:
perform computations which contribute to a final image, which computations comprise:
sorting a stream of triangles into a collection of tile display lists, whereby an original index is electronically forwarded through the triangle processor to the rasterizer, wherein the rasterizer iterates over the triangle to determine which tile it intersects;
determining which triangle will be written into an output command buffer for rendering by processing each tile's display list and iterating each triangle by the said rasterizer;
rendering a plurality of intermediate images in reverse order wherein the said rendering further comprises projecting a plurality of texture coordinates from a current image back into a plurality of dependent images, such that only data from the dependent images which contributes to the current image are computed, recursively; and
performing a single or plurality of visibility sort operations in a streaming fashion through a rendering pipeline.

2. The system of claim 1 further comprising:
a computer architecture which comprises of a plurality of logical nodes or stages connected together in an arbitrary topology; wherein a specific property or properties and a specific resource or resources are associated with each node; and
wherein the said resource or resources associated with each node further comprise means for performing graphics related tasks and general purpose operations.

3. The system of claim 2 wherein the computer architecture further comprises a single or plurality of command buffers comprised in a means for execution commands and synchronization between nodes.

4. The system of claim 2 wherein the computer architecture further comprises a means for delivering all control information and input and out data through a single or plurality of buffers comprising a memory image, wherein the system is caused to:
manage the said buffers as recirculating ring buffers; and
dynamically invalidate information in the buffers such that data does not require writing to a DRAM.

5. The system of claim 1 wherein the computer architecture further comprises a combination of nodes whose properties and resources are predefined such that the said combination is connected in a specific topology and bound to an initial command buffer comprised in a context such that the said context is reconfigurable and further comprises means for:
allowing programmable functionality;
allowing a plurality of rendering pipelines; and
allowing sharing of compute resources while performing multiple tasks.

6. The system of claim 5 wherein each of the plurality of pipelines is divided into a first phase, a second phase, and a third phase.

7. The system of claim 6 wherein in the first phase, the system is caused to:
sort a plurality of streams of triangles into a collection of tile display lists;
identify a geometry that modifies the content of tile comprised in the tile display lists;
perform a triangle tile intersection test which comprises transforming a plurality of vertices into screen space, and computing of position related outputs; and
discard back-facing and non-visible triangles;
forward to a sort unit, an original index into a vertex buffer; and
iterate via the sort unit in the visibility sort operations in the said streaming fashion, over the triangle to determine which tile or tiles the said triangle intersects; and
wherein the sort unit further comprises processing a partially complete tile which has run out of memory, which processing comprises sending the partially complete tile further down the pipeline.

8. The system of claim 6 wherein in the second phase the system is caused to:
determine a single or plurality of triangles that influence a final image;
wherein the said determining comprises performing a hidden surface depth test; and
process each tile's display list (command buffer) comprising:
computing position related outputs; and
discarding entire triangles which do not contribute to the image.

9. The system of claim 8, wherein the system is further caused to:
in the hidden surface depth test, perform a per pixel depth test which comprises iterating each triangle via a depth rasterizer;
in the said per pixel depth test, discard any pixels that do not contribute to a final image;
write a triangle which passes the depth test to an output command buffer, discarding non-contributing triangles; and identify contributing triangles for intermediate images via a draw buffer.

10. The system of claim 6, wherein in the third phase the system is caused to:
process the output command buffer from the depth sorting phase;
identify a single or plurality of contributing triangles comprised in a tile; and
compute position related outputs, which comprises processing pixels which contribute to the final image.

11. The system of claim 1 wherein the said rendering the image in reverse order further comprises:
rendering a final image first which further comprises recursively projecting backwards into a single or plurality of intermediate images, and rendering only those portions of the said intermediate images that contribute to the final image.

12. The system of claim 11 wherein the system is further caused to:
based on a display list comprising multiple draw commands which describe a single or plurality of triangles to be rendered to a current image, compute individual pixel values by processing a subset of the display list and by constraining the image updates to the pixels of interest; and
wherein the display list further comprises state changes and bindings to a plurality of resources.

13. The system of claim 11 wherein the system is further caused to:
divide an image into a plurality of tiles, wherein each tile comprises a corresponding rectangular region;
generate a single or plurality of tile display lists, comprising determining screen space positions of a single or plurality of triangles comprised in each tile, which determining further comprises:
pre-sorting the triangles in the original display list into tile display lists based on the tiles they intersect; and
wherein the said pre-sorting comprises processing the said intersecting tiles' display list.

14. The system of claim 11 wherein the system is further caused to:
sample an intermediate image;
divide a pixel shader of a sampled image into a plurality of segments based upon a location of the sample instruction;
reissue a draw call for a current image, wherein with each draw call reissued, a subsequent segment of the said pixel shader is appended; and
compute the area of the intermediate image to be sampled in a subsequent pass of a current image.

15. The system of claim 13 wherein the system is further caused to:
via a draw buffer, provide references to the contributing triangles for each pixel in an image; wherein the draw buffer is generated at the output of the rasterizer node when processing the intermediate image;
wherein opaque primitives over write the list of contributing triangles in the Draw Buffer, while translucent primitives append the triangle ID to the list; and
wherein the system is further caused to dynamically manage the storage of data in the Draw Buffer to reduce its memory size.

16. The system of claim 11 further comprising:
a three dimensional entity comprised in a dynamic memory object, wherein the system is caused to allocate the last dimension in the said dynamic memory object, dynamically and sparsely;
wherein each layer further comprises a two dimensional array of virtually contiguous pages; wherein a virtually contiguous page address is a cache line address, and a page index is caused to select a specific page within the virtually contiguous pages; and
wherein a layer index is caused to select an appropriate layer;
wherein the size of a virtually contiguous page and an entire layer comprise strides for addressing individual cache lines.

17. The system of claim 16 wherein the system is further caused to:
allocate a new page, which comprises obtaining a plurality of pages from a pool of physical pages, for the said virtually contiguous pages, wherein the said obtaining further comprises obtaining the number of layers currently allocated, which further comprises reading a translation table entry for the first page of the first layer;
store the obtained number in a physical address;
increment the stored number;
copy the physical address for each of the pages within the virtually contiguous page to the last layer; and
write a new page or pages to the first layer.

18. The system of claim 14 wherein the system is further caused to:
perform a valid pixel check and store valid bits in a draw buffer;
reference the tile display list via triangle indices stored in the draw buffer;
insert contributing triangles into a pipeline in an order specified in the draw buffer;
compute necessary pixel values; and
sample, filter and return the computed dependent image pixel values for the computation of the pixels of the current image.

19. The system of claim 18 wherein the system is further caused to:
store a draw-call index and a triangle index in each element of the draw buffer.

20. The system of claim 18 wherein the system is further caused to:
indicate a cleared pixel value is stored in the image, wherein the actual value need not be written because the Draw Buffer carries the needed information;
store the clear value for each intermediate image in state and return the stored value to a sampler, without passing through memory.

21. In a system for reducing power consumption, a method comprising:
reducing memory transactions and computation in graphics rendering, which further comprises:
performing computations which contribute to a final image, which computations comprise:
sorting a stream of triangles into a collection of tile display lists, whereby an original index is electronically forwarded through the triangle processor to the rasterizer, wherein the rasterizer iterates over the triangle to determine which tile it intersects;
determining which triangle will be written into an output command buffer for rendering by processing each tile's display list and iterating each triangle by the said rasterizer;
rendering a plurality of intermediate images in reverse order wherein the said rendering further comprises recursively projecting a plurality of texture coordinates from a current image back into a plurality of dependent images, such that only data from the dependent images which contributes to the current image are computed, recursively; and performing a single or plurality of visibility sort operations in a streaming fashion through a rendering pipeline.

22. The method of claim 21 further comprising:

via a computer architecture which comprises of a plurality of logical nodes or stages connected together in an arbitrary topology, and wherein a specific property or properties and a specific resource or resources are associated with each node, a means for performing graphics related tasks and general purpose operations.

23. The method of claim 22 further comprising, via the said computer architecture a means for execution commands and synchronization between nodes.

24. The method of claim 22 further comprising a means for delivering all control information and input and out data through a single or plurality of buffers comprising a memory image; wherein the method further comprises:

managing the said buffers as re-circulating ring buffers; and dynamically invalidating information in the buffers such that data does not require writing to a DRAM.

25. The method of claim 22 further comprising, in the computer architecture:

a means for predefining properties and resources in a combination of nodes such that the said combination is connected in a specific topology and bound to an initial command buffer comprised in a context such that the said context is reconfigurable and further comprises means for:

allowing programmable functionality;

allowing a plurality of rendering pipelines; and allowing sharing of compute resources while performing multiple tasks.

26. The method of claim 25 wherein each of the plurality of pipelines is divided into a first phase, a second phase, and a third phase.

27. The method of claim 26 further comprising, in the first phase:

sorting a plurality of streams of triangles into a collection of tile display lists;

identifying a geometry that modifies the content of tile comprised in the tile display lists;

performing a triangle tile intersection test which comprises transforming a plurality of vertices into screen space, and computing of position related outputs; and discarding back-facing and non-visible triangles;

forwarding to a sort unit, an original index into a vertex buffer; and iterating via the sort unit, over the triangle to determine which tile or tiles the said triangle intersects.

28. The method of claim 26 further comprising, in the second phase:

determining a single or plurality of triangles that influence a final image;

wherein the said determining comprises performing a hidden surface depth test in a depth sorting phase; and processing each tile's display list (command buffer) comprising computing position related outputs.

29. The method of claim 28, further comprising:

in the hidden surface depth test, performing a per pixel depth test which comprises iterating each triangle via a rasterizer;

in the said per pixel depth test, discarding any pixels that do not contribute to a final image;

writing a triangle which passes the depth test to an output command buffer; and identifying contributing triangles for intermediate images via a reverse rendering draw buffer.

30. The method of claim 28 further comprising, in the third phase:

processing the output command buffer from the depth sorting phase;

identifying a single or plurality of contributing triangles comprised in a tile; and computing position related outputs, which comprises processing pixels which contribute to the final image.

31. The method of claim 21 wherein the said rendering the image in reverse order further comprises:

rendering a final image first which further comprises recursively projecting backwards into a single or plurality of intermediate images, and rendering only those portions of the said intermediate images that contribute to the final image.

32. The method of claim 31 further comprising:

based on a display list comprising multiple draw commands which describe a single or plurality of triangles to be rendered to a current image, computing individual pixel values by processing a subset of the display list and by constraining the image updates to the pixels of interest; and wherein the display list further comprises state changes and bindings to a plurality of resources.

33. The method of claim 31 further comprising:

dividing an image into a plurality of tiles, wherein each tile comprises a corresponding rectangular region;

generating a single or plurality of tile display lists, comprising determining screen space positions of a single or plurality of triangles comprised in each tile, which determining further comprises:

pre-sorting the triangles in the original display list into tile display lists based on the tiles they intersect; and wherein the said pre-sorting comprises processing the said intersecting tiles' display list.

34. The method of claim 31 further comprising:

sampling an intermediate image;

dividing a pixel shader of a sampled image into a plurality of segments based upon a location of the sample instruction;

reissuing a draw call for a current image, wherein with each draw call reissued, a subsequent segment of the said pixel shader is appended; and computing the area of the intermediate image to be sampled in a subsequent pass of a current image.

35. The method of claim 34 further comprising:

via a draw buffer, providing references to the contributing triangles for each pixel in an image; wherein the draw buffer is generated at the output of the rasterizer node when processing the intermediate image; and wherein opaque primitives over write the list of contributing triangles in the Draw Buffer, while translucent primitives append their triangle ID to the list; and wherein the method further comprises dynamically managing the storage of data in the Draw Buffer to reduce its memory size.

36. The method of claim 31 further comprising, in a three dimensional entity comprised in a dynamic memory object:

allocating the last dimension in the said dynamic memory object, dynamically and sparsely; and wherein each layer further comprises a two dimensional array of virtually contiguous pages; wherein a virtually contiguous page address is a cache line address and a page index is caused to select a specific page within the virtually contiguous pages; and wherein a layer index is caused to select an appropriate layer;

wherein the size of a virtually contiguous page and an entire layer comprise strides for addressing individual cache lines.

37. The method of claim 36 further comprising:

allocating a new page, which comprises obtaining a plurality of pages from a pool of physical pages, for the said virtually contiguous pages; wherein the said obtaining further comprises obtaining the number of layers currently allocated, which further comprises reading a translation table entry for the first page of the first layer;

storing the obtained number in a physical address;

incrementing the stored number;

copying the physical address for each of the pages within the virtually contiguous page to the last layer; and writing a new page or pages to the first layer.

38. The method of claim 34 further comprising:

performing a valid pixel check and storing valid bits in a draw buffer;

referencing the tile display list via triangle indices stored in the draw buffer;

inserting contributing triangles into a pipeline in an order specified in the draw buffer;

computing necessary pixel values; and sampling, filtering and returning the computed pixel values to a shader program.

39. The method of claim 38 further comprising:

storing a draw-call index and a triangle index in each element of the draw buffer.

40. The method of claim 38 further comprising:

indicating a cleared pixel value is stored in the image; wherein the actual value need not be written because the Draw Buffer carries the needed information;

storing the clear value for each intermediate image in state and returning the stored value to a sampler, without passing through memory.

41. A system for reducing power consumption comprising:

at least one electronically reconfigurable processor and a non-transitory electronically accessed memory storage element coupled to the said processor;

encoded instructions stored in the said storage element, when implemented by the said processor configures the said system to reduce memory transactions and computation in graphics rendering, wherein the said system is further caused to:

perform computations which contribute to a final image, which computations comprise:

sorting a stream of triangles into a collection of tile display lists;

determining which triangle will be written into an output command buffer for rendering by processing each tile's display list and iterating each triangle by the said rasterizer;

rendering a plurality of intermediate images in reverse order wherein the said rendering further comprises projecting a plurality of texture coordinates from a current image back into a plurality of dependent images, such that only data from the dependent images which contributes to the current image are computed, recursively; and performing a single or plurality of visibility sort operations in a streaming fashion through a rendering pipeline.

* * * * *